United States Patent [19]

Skinner

[11] Patent Number: 4,505,993
[45] Date of Patent: Mar. 19, 1985

[54] BATTERY HOUSING

[75] Inventor: Neal G. Skinner, Duncan, Okla.

[73] Assignee: Halliburton Company, Duncan, Okla.

[21] Appl. No.: 609,064

[22] Filed: May 9, 1984

[51] Int. Cl.³ .............................................. H01M 2/02
[52] U.S. Cl. ..................................... 429/100; 429/56; 220/207
[58] Field of Search ....................... 429/53, 56, 72, 82, 429/89, 100, 163, 176; 220/203, 207

[56] References Cited

U.S. PATENT DOCUMENTS

| | | | |
|---|---|---|---|
| 3,559,840 | 2/1971 | Wilson et al. | 429/89 X |
| 4,296,186 | 10/1981 | Wolf | 429/54 |
| 4,329,405 | 5/1982 | Zupancic | 429/56 |
| 4,338,382 | 7/1982 | Fritts | 429/53 |
| 4,397,919 | 8/1983 | Ballard | 429/53 |

Primary Examiner—Anthony Skapars
Attorney, Agent, or Firm—Joseph A. Walkowski; Thomas R. Weaver

[57] ABSTRACT

The present invention comprises a battery housing suitable for holding a battery which may generate a dangerously high level of internal pressure. The housing includes a receptacle having a vent passage covered by a rupture disc, the rupture disc in turn covered by a diffuser head having a longitudinal bore therein extending from the rupture disc to a blind end, the bore being traversed by at least one lateral passage leading to the exterior of the housing. Upon reaching a predetermined internal pressure level, the rupture disc ruptures and vents the interior of the housing safely to the exterior through the lateral passage.

20 Claims, 1 Drawing Figure

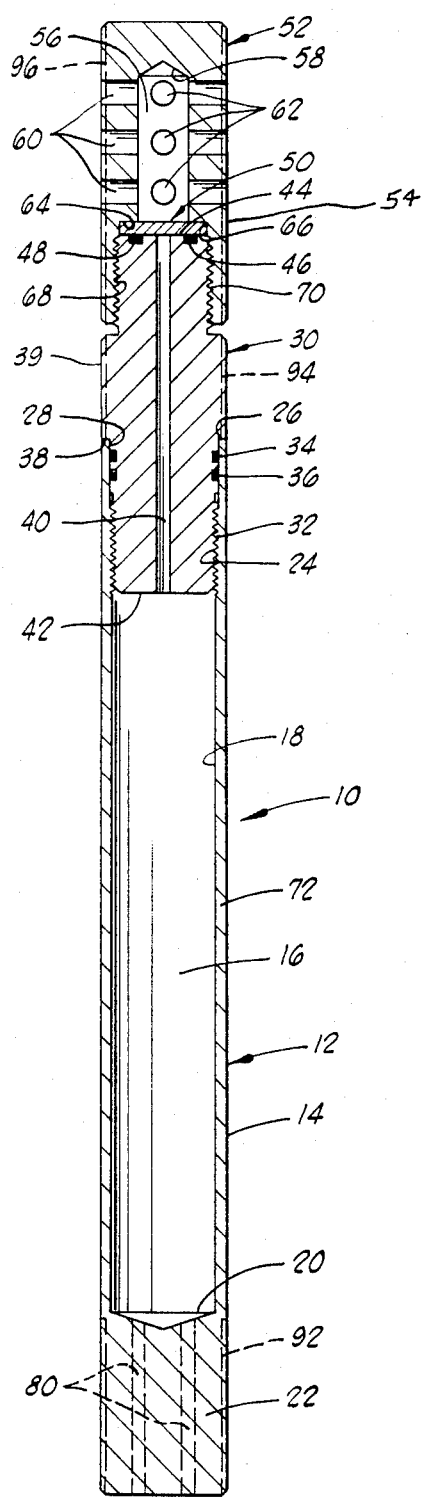

BATTERY HOUSING

BACKGROUND OF THE INVENTION

Recent improvements in durability and reliability of electronic devices for the measurement of temperature, pressure and other parameters have led to widespread use of same in hostile environments such as are encountered by the petroleum industry in well bores. Some of these devices are run into the well bore at the end of an electric cable (commonly referred to as a "wireline") which can provide a power source as well as a real-time retrieval means for data from the device. However, in other instances use of a wireline is precluded due to the necessity of providing a relatively unobstructed flow path for formation fluid, which path would be blocked by an instrument pod in the bore of the pipe string through which the test is to be run. It is also somewhat dangerous to run an instrument pod on a wireline below a shutoff valve in the pipe string, such as a ball valve, because the wireline, if not severed when the ball is rotated to close it during an emergency, may cause a blowout of well fluid by jamming the valve open.

Accordingly, it has become common practice to run measuring devices of the aforesaid type in the well bore in an instrument housing incorporated in the wall of the pipe string either above or below the valve or valves therein, and to record data taken during the testing of the well for subsequent review. Of course, these devices require a power source providing a relatively high power output in a compact size. By way of example, and not limitation, one such battery is the RMM 150 Li/Cl$_2$ in SO$_2$ Cl$_2$ battery, produced by Electrochem Industries of Clarence, N.Y. This battery, as well as other lithium-based batteries, comprise sealed cells which may literally explode when elevated to a certain level above ambient temperature. For example, the aforesaid RMM 150 battery may explode at approximately 420°–425° F. with sufficient force to rupture a housing having a burst pressure in excess of 25,000 psi. Other lithium cells, such as LiSO$_2$ cells, will explode at even lower temperatures, at about 350° F. In the event of a short circuit or other heating of the battery beyond its limits as noted above, the cell literally becomes a lethal bomb or grenade.

Prior art attempts have been made to design cells that will vent a substantial increase in internal pressure in a safe manner. Such a design is disclosed in U.S. Pat. No. 4,338,382, which design includes a burst diaphragm topped by a ball and split ring or other assembly designed to interrupt circuit continuity in the battery while either preventing escape of the gas inside the cell or venting the gas in a controlled manner. This design, however, assumes that internal pressure will be generated by overcharge or extended discharge of the cell, and does not provide for the situation where a cell may be externally heated, such as may occur in a fire, or in a deep well bore. In such an instance, the "controlled" venting will not prevent explosion of the cell. Another design attempting to address the explosion problem is disclosed in U.S. Pat. No. 4,397,919. This design includes a non-cylindrical cell cross-section to permit bulging under an increase in internal pressure and a venting mechanism which relies upon the melting of a plug at the end of the cell to permit escape of internal pressure above the melting point of the plug. Again, this design primarily addresses the explosion problem due to short-circuiting and overcharge condition, and assumes that the initial bulging of the case and venting of the internal pressure will preclude explosion. Both of these patents, however, fail to address the damage which may be caused by the pressurized venting fluid to objects or personnel in its path, nor do they adequately address a relatively sudden heating of the cell which would build internal pressure much faster than it could be vented.

SUMMARY OF THE INVENTION

In contrast to the prior art, the battery housing of the present invention comprises an effective means for containing explosions of battery cells housed therein and for avoiding damage due to the venting of a cell in which a high pressure has been generated for any reason. The battery housing of the present invention comprises a battery chamber closed at one end by a rupture disc which is maintained over a vent passage by a diffuser head having a longitudinal bore therein which extends from the side of the rupture disc opposite the vent passage. This longitudinal bore has a blind end, and is traversed by at least one lateral passage extending to the side of the diffuser head. Thus, when a battery cell within the housing leaks or ruptures from internal pressure, the rupture disc will rupture at a predetermined pressure level and pressure in the battery chamber will be vented to the exterior of the housing through the lateral passage, while the blind end of the diffuser head bore reduces the force of the stream of pressurized fluid and debris from the cell, and helps contain shrapnel from the ruptured disc, thereby minimizing damage to personnel or property.

BRIEF DESCRIPTION OF THE DRAWING

The present invention will be more fully understood by one of ordinary skill in the art by a review of the following detailed description of the preferred embodiment, taken in conjunction with the attached drawing FIGURE which comprises a full sectional elevation of a battery housing of the present invention.

DETAILED DESCRIPTION AND OPERATION OF THE PREFERRED EMBODIMENT

Referring to the drawing FIGURE, the preferred embodiment of battery housing 10 of the present invention comprises a tubular receptacle 12 having a relatively uniform diameter outer surface 14 and a battery chamber 16 on the interior thereof, chamber 16 being partially defined by side interior wall 18 and bottom interior wall 20 of receptacle base 22. The upper portion of side interior wall 18 possesses threads 24 thereon, spaced from the upper lip 26 of receptacle by smooth sealing surface 28.

Coupling 30 extends into receptacle 12, threads 32 on the lower exterior thereof mating with threads 24, and O-rings 34 and 36 providing a pressure-tight seal with sealing surface 28 between receptacle 12 and coupling 30. When fully made up to coupling 30, lip 26 of receptacle 12 abuts shoulder 38 on coupling 30. Above shoulder 38, exterior surface 39 is of approximately the same exterior diameter as receptacle 12. Longitudinal vent passage 40 extends from the bottom 42 of coupling 30, which defines the top of chamber 16, to the flat top 44 of coupling 30, which possesses annular recess 46 therein. Recess 46 contains O-ring 48, over which extends rupture disc 50.

Rupture disc 50 is maintained over vent passage 40 and in sealing compression against O-ring 48 by diffuser head 52, which possesses an exterior 54 of substantially the same diameter as receptacle 12 and coupling 30. Longitudinal bore 56 extends from rupture disc 50 to blind upper end 58, bore 56 being intersected by a first plurality of lateral passages 60, and a second plurality of longitudinal passages 62 at 90° angles thereto, all of which communicate between bore 56 and exterior 54 of diffuser head 52, and which are preferably of smaller diameter than that of bore 56.

Adjacent the bottom of bore 56, annular shoulder 64 extends radially outward in diffuser head 52 to wall 66, of slightly greater diameter than disc 50. Below wall 66, threads 68 extend downward on the interior of diffuser head 52, and mate with threads 70 on the upper portion of coupling 30, clamping the rupture disc 50 in the diffuser head 52.

Receptacle 12, coupling 30 and diffuser head 52 are preferably formed of Custom 455 high strength stainless steel manufactured by Carpenter Technology Corporation of Reading, Penna., and the thickness of wall 72 of receptacle 12 may be varied to effect a specific burst pressure. Rupture disc 50 is preferably one-sixteenth inch in thickness and formed of oxygen free, high conductivity copper which is annealed at 1100° F. for one hour, which parameters provide a substantially consistent disc rupture pressure. Of course, other materials may be substituted for those mentioned hereabove, materials choice being within the ability of one of ordinary skill in the art.

While the preferred embodiment of battery housing 10 as shown has been designed primarily for transport of batteries, of course the same housing might be employed to contain a battery or batteries as they are used to power an electronic device on the surface of the earth, in aircraft or marine vessels, or in a well bore. Merely by incorporating insulated electrical connectors in base 22 of receptacle 12 as shown by broken lines 80, a battery within housing 10 may be employed to power an electronic device without losing the pressure integrity of housing 10. Of course, such connectors and means for installing same in bore 22 are well known in the art, and need not be discussed further herein.

If housing 10 is employed with electronic devices employed in a well bore, it may be subject to high external pressures of thousands of pounds per square inch. In such an event, lateral passages 60 and 61 as well as longitudinal bore 56 of diffuser head 52 and rupture disc 50 may also be exposed to well bore pressure. However, due to the relative sizing of longitudinal bore 56 and of vent passage 40, external well bore pressure effectively acts only over the portion of rupture disc 50 overlaying the diameter of passage 40, while internal pressure inside housing 10 acts across the much larger diameter of bore 56. In such a manner, disc 50 can be made to resist high external pressure while yielding to lower internal pressure from chamber 16. By appropriately varying the diameters of passage 40 and bore 56, the desired external pressure resistance can be combined with the desired internal pressure rupture level.

To load housing 10, a battery (not shown) is inserted in receptacle 12, contacting connectors 80 if such are present, and being properly aligned therewith by coacting plugs or other means well known in the art. Coupling 30 with diffuser head 52 already made up thereto over rupture disc 50 is then threaded to receptacle 12. Of course, receptacle 12, coupling 30 and diffuser head 52 may all possess flats machined thereon, as shown at 92, 94 and 96, to assist in applying torque to make the parts up with each other.

When internal pressure in housing 10 reaches a predetermined pressure, from short-circuiting or other heating of the battery therein, pressure transmitted through vent passage 40 will cause rupture disc 50 to rupture and the internal pressure will be vented through bore 56 and lateral passages 60 and 62 in diffuser head 52 to the exterior of the housing. Lateral passages 60 and 62 are of a smaller diameter than bore 56. When shear disc 50 ruptures, a center section slightly smaller than the diameter of bore 56 will be sheared out. The section will be larger than passages 60 and 62 and normally will be contained in the diffuser head.

Thus it is apparent that a novel and unobvious battery housing has been invented. Of course, many additions, deletions and modifications may be made to the preferred embodiment without departing from the spirit and scope of the claimed invention. For example, a single lateral passage may be employed in the diffuser head; connecting means such as Allen screws or lug and slot combinations may be employed in lieu of threads to connect any of the diffuser head, coupling or receptacle to each other; variations in the absolute and relative sizes of the diffuser head bore and coupling vent passage may be made, as noted above; the base of the receptacle may be removable and the battery inserted at the bottom of the housing, an advantage if it is desired to connect the battery to connectors in the bore; the top of the receptacle may be made in one piece and a vent passage formed therein, the diffuser head being then directly connected to the receptacle and the coupling eliminated, access to the battery chamber being via a removable base; and others.

I claim:

1. A housing adapted to contain a battery therein, comprising:
    receptacle means having a battery chamber therein and vent passage means associated therewith having an inlet and an outlet, said inlet opening on said battery chamber;
    rupture disc means disposed across said outlet; and
    diffuser head means over said rupture disc, said diffuser head means including a longitudinal bore therein having an open end and a blind end and at least one lateral passage intersecting said longitudinal bore and extending to the exterior of said housing, said open end of said bore being disposed adjacent said rupture disc means.

2. The apparatus of claim 1, wherein said receptacle means is substantially tubular.

3. The apparatus of claim 2, wherein said substantially tubular receptacle means is open at one end, said open end being removably closed by coupling means having said vent passage means extending therethrough.

4. The apparatus of claim 3, wherein said vent passage means and said longitudinal bore are substantially coaxial.

5. The apparatus of claim 4, wherein said diffuser head means is secured to said coupling means and said coupling means is secured to said receptacle means.

6. The apparatus of claim 5, wherein said coupling carries O-ring means in a recess surrounding said vent passage means outlet.

7. The apparatus of claim 6, further including electrical connector means extending from said battery chamber to the exterior of said housing.

8. The apparatus of claim 1, wherein said at least one lateral passage is of lesser diameter than said longitudinal bore.

9. The apparatus of claim 8, wherein said at least one lateral passage comprises a plurality of lateral passages extending from one side of said diffuser head means through said longitudinal bore to the other side of said diffuser head means.

10. The apparatus of claim 9, wherein said plurality of lateral passages are vertically aligned.

11. The apparatus of claim 10, further including a second plurality of vertically aligned longitudinal passages disposed through said bore at a substantially right angle to said first plurality of lateral passages.

12. The apparatus of claim 11, wherein said receptacle means is substantially tubular.

13. The apparatus of claim 12, wherein said substantially tubular receptacle means is open at one end, said open end being removably closed by coupling means having said vent passage means extending therethrough.

14. The apparatus of claim 13, wherein said vent passage and said longitudinal bore are substantially coaxial.

15. The apparatus of claim 14, wherein said diffuser head means is secured to said coupling means and said coupling means is secured to said receptacle means.

16. The apparatus of claim 15, wherein said coupling carries O-ring means in a recess surrounding said vent passage means outlet.

17. The apparatus of claim 16, further including electrical connector means extending from said battery chamber to the exterior of said housing.

18. The apparatus of claim 1, further including electrical connector means extending from said battery chamber to the exterior of said housing.

19. A battery housing comprising:
a substantially tubular receptacle having a closed end and an open end;
removable closure means across said open end;
a vent passage having an inlet end in communication with the interior of said receptacle and an outlet end;
a rupture disc sealingly disposed across said outlet end;
a diffuser head having a longitudinal bore open at one end positioned with said one end adjacent said rupture disc in substantially coaxial relationship with said vent passage outlet end; and
at least one lateral passage of lesser diameter than and intersecting said longitudinal bore, opening on the exterior of said diffuser head.

20. The apparatus of claim 19, further including at least one electrical connector extending from the interior of said receptacle to the exterior of said housing.

* * * * *